No. 665,506. Patented Jan. 8, 1901.
J. A. CARLSON.
PUMP PLUNGER.
(Application filed May 6, 1899.)
(No Model.)
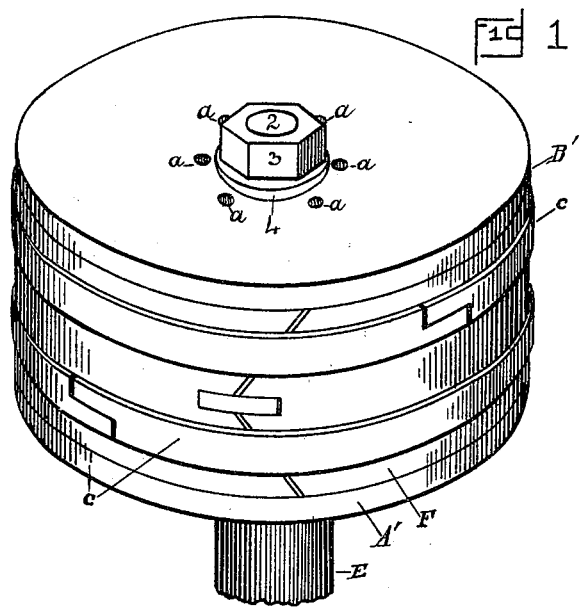
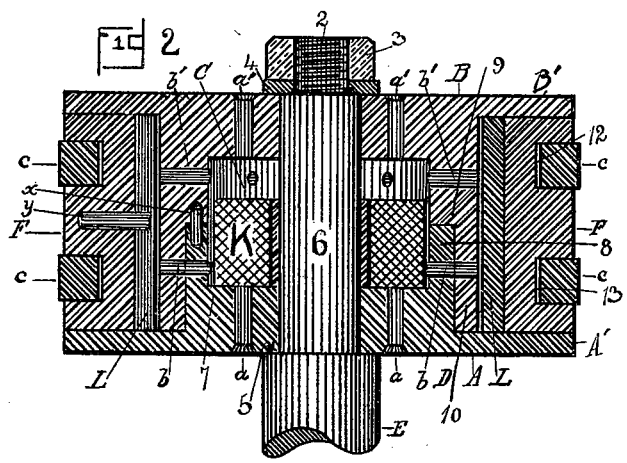
Witnesses:
C. F. Patterson
M. A. Dodsworth
Inventor.
John A. Carlson,
per George W. Suo
Attorney.

UNITED STATES PATENT OFFICE.

JOHN A. CARLSON, OF STROMSBURG, NEBRASKA.

PUMP-PLUNGER.

SPECIFICATION forming part of Letters Patent No. 665,506, dated January 8, 1901.

Application filed May 6, 1899. Serial No. 715,863. (No model.)

*To all whom it may concern:*

Be it known that I, JOHN A. CARLSON, residing at Stromsburg, in the county of Polk and State of Nebraska, have invented certain useful Improvements in Pump-Plungers; and I do hereby declare that the following is a full, clear, and exact description thereof, such as will enable others skilled in the art to which it appertains to make and use the same, reference being had to the accompanying drawings, which form a part of this specification.

This invention has relation to an improvement in pump-plungers and piston-heads.

The object of my invention is to provide a plunger or piston-head adapted to form an exceedingly tight union within the casing in connection with which it is operated.

In the accompanying drawings I have shown in Figure 1 a perspective view of a plunger or piston-head embodying my invention. Fig. 2 shows a central sectional view thereof.

Referring to the drawings, E represents a suitable rod, the end 2 of which is threaded and is provided with a nut 3 and washer 4. Working between the shoulder 5 and the washer 4, which shoulder is formed in making the end 6 of a reduced diameter, are the two end sections of my pump-plunger and piston-head, one section being marked A and the other B, as is shown in Fig. 2. The section A is provided with the flange or disk extension A' and an inner upwardly-extending hub 7, from which hub extends a sleeve 8, as is shown. This lower section A is provided with the escape-openings $a$, which run lengthwise of the rod E, while transversely of the sleeve 8 are the openings $b$. Telescoping upon the lower section A is the upper or second section B, which section is provided with the inwardly-extending hub 9 and the extending sleeve 10, which sleeve surrounds the hub 7 and sleeve 8 of the section A, while the section B is further provided with the flat or disk extension B'. The section B is further provided with the openings $a'$ and $b'$, and the extension 9 is made to register near the inner edge of the sleeve 8, so that an annular chamber C is provided, into which chamber extend the ducts $b$ and $b'$. The section B is at one or more suitable points provided with the pin $x$, entering a suitable opening within the sleeve 8 of the section A, so that these two telescope sections are securely united. Working between the flanges A' and B' is the ring F, provided with the annular grooves 12 and 13, within which grooves work the packing-rings $c$, of the usual spring-ring type. This ring F is preferably in three sections, so that one section tees into the other. Working between the sectional ring F and the section B is a split ring L, which loosely works between these two members, this ring L being connected to the various ring-sections F by means of a pin $y$, as is shown. Working within the annular chamber within the sections A and B and surrounding the stem portion 6 is a valve K, which works freely up and down within this chamber and is of any suitable material and is adapted to alternately close the openings $a$ and $a'$.

As usually constructed the piston must run at all times tight enough to insure against leakage under the highest pressure. With my improvement the pressure is directly apportionate to the pressure in the cylinder, and when this begins to fall at the end of the stroke the pressure of the packing also begins to fall, which increases the life of the piston as well as that of the cylinder. This is accomplished as follows: In operation the steam or water would enter, we will assume, the lower opening $a$, the valve K would at once be thrown upward to close the openings $a'$, so that the water or steam pressure would expand the ring L in passing through the ducts $b$ and $b'$, and this ring in turn would carry the sectional ring F outward, and this sectional ring F in turn would carry with it and expand the packing-rings $c$ $c$, which are of some suitable material, so that from this it will be seen that if a very great pressure is within the chamber C an exceedingly snug union between the housing and the packing-ring $c$ is insured, while if the pressure is not very great a less-tight union is required, and consequently the steam exerts a lower degree of pressure upon the ring 11 and members operated thereby. In the return stroke of course the opposite holes are closed by the valve, so that the packing-rings $c$ $c$ are again expanded to insure an absolutely snug union; and,

Having thus described my said invention, what I claim as new, and desire to secure by United States Letters Patent, is—

In a pump-plunger of the character described, a suitable rod provided with an upper and a lower end section, the lower section being provided with an inwardly-extending hollow hub, there being escape-openings within this lower section, while openings are positioned transversely within said hollow hub, said upper section telescoping over said hollow hub and being provided with registering transverse openings, said upper section also being provided with a hollow hub having transverse and vertical openings therein, said two telescoping upper and lower sections being suitably united, packing-rings working between said two end sections, a split ring working between said packing-ring and said hollow hubs, and a plunger-valve working within said hollow hubs which form a chamber to alternately close the vertical openings within said end sections.

Signed in the presence of two witnesses.

JOHN A. CARLSON.

Witnesses:
MILTON A. MAKEEVER,
JOHN E. PETERSON.